(12) United States Patent
Ma et al.

(10) Patent No.: US 10,782,546 B2
(45) Date of Patent: Sep. 22, 2020

(54) DISPLAY MODULE AND DISPLAY DEVICE

(71) Applicant: BOE TECHNOLOGY GROUP CO., LTD., Beijing (CN)

(72) Inventors: Yongda Ma, Beijing (CN); Yong Qiao, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 29 days.

(21) Appl. No.: 15/780,015

(22) PCT Filed: Oct. 26, 2017

(86) PCT No.: PCT/CN2017/107864
§ 371 (c)(1),
(2) Date: May 30, 2018

(87) PCT Pub. No.: WO2018/077221
PCT Pub. Date: May 3, 2018

(65) Prior Publication Data
US 2018/0356671 A1      Dec. 13, 2018

(30) Foreign Application Priority Data

Oct. 28, 2016   (CN) ...................... 2016 2 1196317 U

(51) Int. Cl.
G02F 1/1333      (2006.01)
(52) U.S. Cl.
CPC ............... G02F 1/133308 (2013.01); *G02F 2001/13332* (2013.01); *G02F 2001/133314* (2013.01);
(Continued)

(58) Field of Classification Search
None
See application file for complete search history.

(56) References Cited

U.S. PATENT DOCUMENTS 5,659,376 A * 8/1997 Uehara ............. G02F 1/133308
348/794
2005/0088067 A1   4/2005 An
(Continued)

FOREIGN PATENT DOCUMENTS

CN    102520533 A    6/2012
CN    102591049 A    7/2012
(Continued)

OTHER PUBLICATIONS

International Search Report dated Jan. 24, 2018.

*Primary Examiner* — Phu Vu
(74) *Attorney, Agent, or Firm* — Dilworth & Barrese, LLP.; Michael J. Musella, Esq.

(57) ABSTRACT

Embodiments of the present disclosure provide a display module and a display device. The display module includes a rear frame, a display panel and a front frame; the front frame includes a first holding part, the rear frame includes a second holding part, and the first holding part is disposed to be opposite to the second holding part along a thickness direction of the display panel; an edge of the display panel is held between the first holding part and the second holding part; the first holding part is provided with a bending part which is bent towards the second holding part; and the first holding part and the second holding part are connected through a fastener disposed in the bending part so as to fasten the display panel.

20 Claims, 4 Drawing Sheets

(52) U.S. Cl.
CPC ............ *G02F 2001/133317* (2013.01); *G02F 2001/133325* (2013.01); *G02F 2201/46* (2013.01)

(56) References Cited

U.S. PATENT DOCUMENTS

| | | | |
|---|---|---|---|
| 2010/0046178 A1* | 2/2010 | Bao | H05K 5/02 |
| | | | 361/752 |
| 2010/0296022 A1* | 11/2010 | Ando | G02F 1/133308 |
| | | | 349/58 |
| 2013/0258231 A1 | 10/2013 | Li et al. | |
| 2015/0373859 A1* | 12/2015 | Hwang | H05K 5/0017 |
| | | | 362/611 |

FOREIGN PATENT DOCUMENTS

| | | |
|---|---|---|
| CN | 202332108 U | 7/2012 |
| CN | 202972966 U | 6/2013 |
| CN | 206163031 U | 5/2017 |
| JP | 2002116709 A | 4/2002 |

\* cited by examiner

O-O'

A-A'

DISPLAY MODULE AND DISPLAY DEVICE

TECHNICAL FIELD

Embodiments of the present disclosure relate to a display module and a display device.

BACKGROUND

With the development of technology, various types of display products have been increasingly widely used in people's daily lives as well as works and studies.

Currently, an existing display product mainly includes a display module. As illustrated in FIG. 1a and FIG. 1b (a cross-sectional view taken along O-O' direction of FIG. 1a), the display module includes a backlight module 10, a rear frame 20, a display panel 30 and a front frame 40; the backlight module 10 typically includes a backplate, a backlight source, a light guide plate, an optical film and the like.

As illustrated in FIG. 1b, in the existing technology, the display panel 30 is fastened by means of a fastener 50 disposed between the front frame 40 and the rear frame 20. However, during assembling the above-mentioned display module, the display panel 30 may be prone to be subjected to an excessively greater local compression because of a stress concentration around the fastener 50. As a result, during performing display function by the display panel, a stress line may be occurred at a location having the local compression. The stress line would be especially obvious in case of displaying an image with a single color. This will negatively affect a normal display of the image.

SUMMARY

The embodiments of the present disclosure provide a display module and a display device.

The embodiments of the present disclosure adopt technical solutions as below.

One aspect of the present disclosure provides a display module, including a rear frame, a display panel and a front frame; the front frame includes a first holding part, the rear frame includes a second holding part, and the first holding part is disposed to be opposite to the second holding part along a thickness direction of the display panel; an edge of the display panel is held between the first holding part and the second holding part; the first holding part is provided with a bending part which is bent towards the second holding part; and the first holding part and the second holding part are connected through a fastener disposed in the bending part so as to fasten the display panel.

In an example, the bending part has a strip-shaped structure, and an inner edge of the strip-shaped structure is equidistant or substantially equidistant from the edge of the display panel, at any location along a length direction of the strip-shaped structure.

In an example, a side of the second holding part facing to the first holding part is provided with a protrusion which abuts against a side surface of the display panel.

In an example, a height of the protrusion is greater than or equal to a thickness of the display panel.

In an example, an elastic structure is disposed between the first holding part and the display panel; and/or, an elastic structure is disposed between the second holding part and the display panel.

In an example, the elastic structure includes at least one of estersil pad, rubber pad and elastic foam.

In an example, a side of the second holding part facing to the first holding part is provided with at least one limiting pole at a location excluding the one corresponding to the bending part, the first holding part is provided with a limiting hole, and the limiting pole is configured to be protruded into the limiting hole; or, a side of the first holding part facing to the second holding part is provided with at least one limiting pole at a location excluding the one corresponding to the bending part, the second holding part is provided with a limiting hole, and the limiting pole is configured to be protruded into the limiting hole.

In an example, the display module further includes a backlight module disposed at a side of the rear frame facing away from the display panel, and the backlight module is connected to the second holding part by means of the fastener penetrating through the first holding part and the second holding part.

In an example, the fastener includes a screw and an insert nut.

Another aspect of the present disclosure further provides a display device including any of the preceding display modules.

BRIEF DESCRIPTION OF THE DRAWINGS

Hereafter, in order to clearly describe technical solutions of the embodiments in the present disclosure in a better way, those drawings necessary for the explanation of the embodiments will be briefly introduced. Obviously, the drawings to be described are merely some illustrations of the present disclosure, from which those skilled in the art may achieve other figures without any creative labors.

FIG. 1b is a cross-sectional view taken along O-O' direction of FIG. 1a;

DETAILED DESCRIPTION

Hereafter, the technical solutions in the embodiments of the present disclosure will be clearly, completely described with reference to the drawings in the embodiments of the present disclosure. Obviously, the embodiments described are only a part of the embodiments, not all embodiments. Based on the embodiments in the present disclosure, all other embodiments obtained by one skilled in the art without paying inventive labor are within the protection scope of the present disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
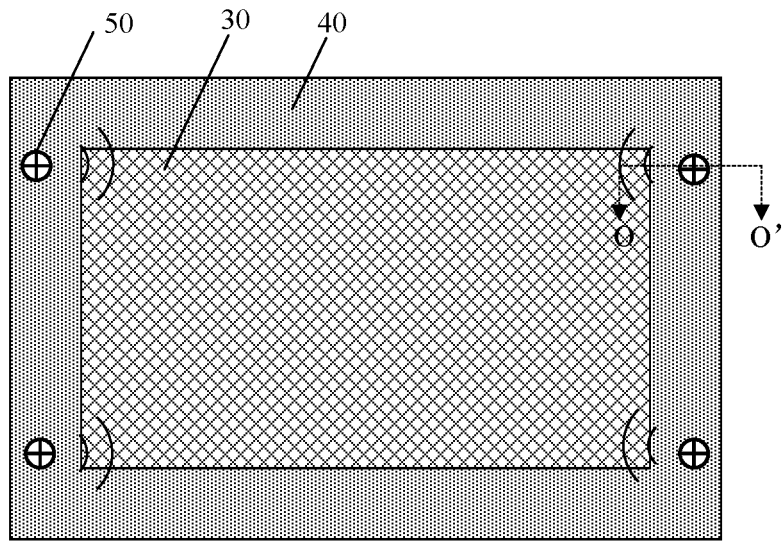
FIG. 1a is a plan view of a display module provided by the existing technology.
Figure 1B:
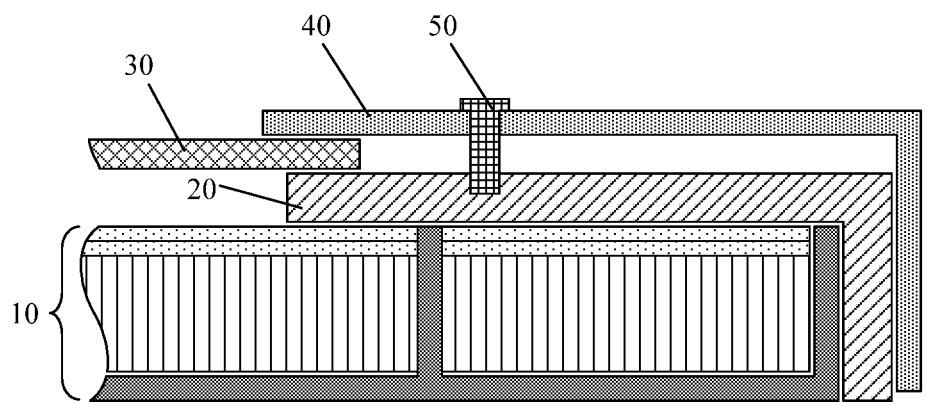
Figure 2:
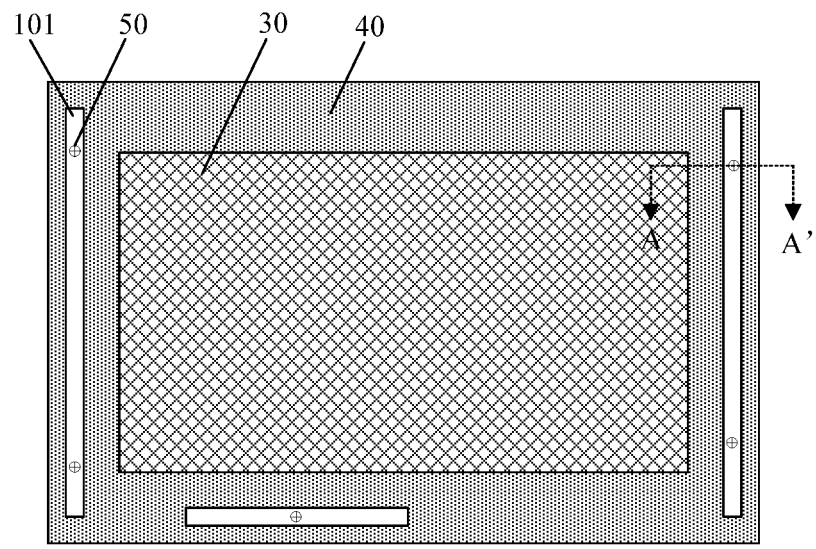
FIG. 2 is a structural schematic view of a display module provided by an embodiment of the present disclosure.
Figure 3:
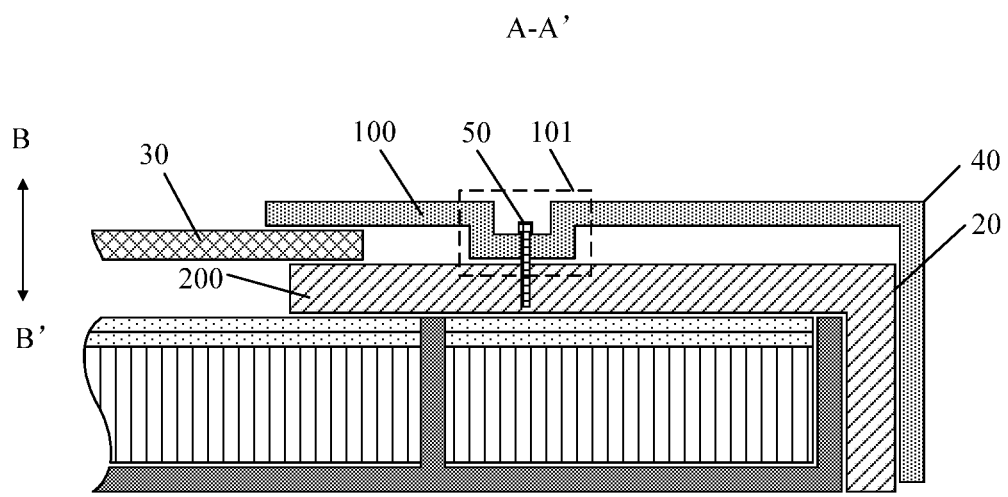
FIG. 3 is a schematic cross-sectional view taken along A-A' direction of FIG. 2.

The embodiment of the present disclosure provides a display module. As illustrated in FIG. 2 and FIG. 3 illustrating a cross-sectional view taken along A-A' direction of FIG. 2, the display module includes a rear frame 20, a display panel 30 and a front frame 40. The front frame 40 includes a first holding part 100, the rear frame 20 includes a second holding part 200, and the first holding part 100 is disposed to be opposite to the second holding part 200 along a thickness direction B-B' of the display panel 30; an edge of the display panel 30 is held between the first holding part 100 and the second holding part 200 so that the display panel 30 is held and fastened through an action force applied to the display panel 30 by the first holding part 100 and the second holding part 200.

In an example, the first holding part 100 is provided with a bending part 101 which is bent towards the second holding part 200; and the first holding part 100 and the second holding part 200 are connected through a fastener 50 disposed in the bending part 101 so as to fasten the display panel 30 through the first holding part 100 and the second holding part 200. For example, as illustrated in FIG. 3, by means of the bending part 101, the fastener 50 may be passing through the first holding part 100 and then protruded into the second holding part 200. With the arrangement of the fastener in the bending part, when the first holding part and the second holding part are fixedly connected through the fastener, the irregular stress generated around the fastener will be diffused to the bending part so that the irregular stress at a location on the fastener corresponding to the display panel is dispersed and hence reduced, which avoids an excessively greater local compression and a display failure of image occurred due to the irregular stress locally concentrated on the display panel.

In an example, in order for the above-mentioned bending part 101 to further disperse the stress generated around the fastener 50, as illustrated in FIG. 2, the above-mentioned bending part 101 may be configured as a strip-shaped structure, and an inner edge of the strip-shaped structure is equidistant or substantially equidistant from the edge of the display panel 30 at any location along a length direction of the strip-shaped structure, so that the stress subjected by the display panel 30 may be uniformly distributed to further prevent from an excessively greater local compression on the display panel 30.

Herein, it should be noted that, the above-mentioned "an inner edge of the strip-shaped structure is equidistant or substantially equidistant from the edge of the display panel, at any location along a length direction of the strip-shaped structure" refers to that, the strip-shaped structure may be a curved, strip-shaped structure or may be a straight, strip-shaped structure, depending on a specific shape of the edge of the display panel 30, without particularly defined in the embodiments of the present disclosure, as long as the inner edge of the strip-shaped structure is equidistant or substantially equidistant from the edge of the display panel 30 at any location along a length direction of the strip-shaped structure. For example, as illustrated in FIG. 2, when the edge of the display panel 30 is formed as a straight line, the strip-shaped structure is configured as a straight, strip-shaped structure; for another example, when the edge of the display panel 30 is formed as a circular arc, the strip-shaped structure is configured as an arc-like, curved, strip-shaped structure.

Moreover, as illustrated in FIG. 2, a single bending part 101 may be provided with only one fastener 50, and may also be provided with two fasteners 50, without particularly defined in the embodiments of the present disclosure; that is, an amount of the fastener 50 may be configured according to actual demands.

Figure 4:
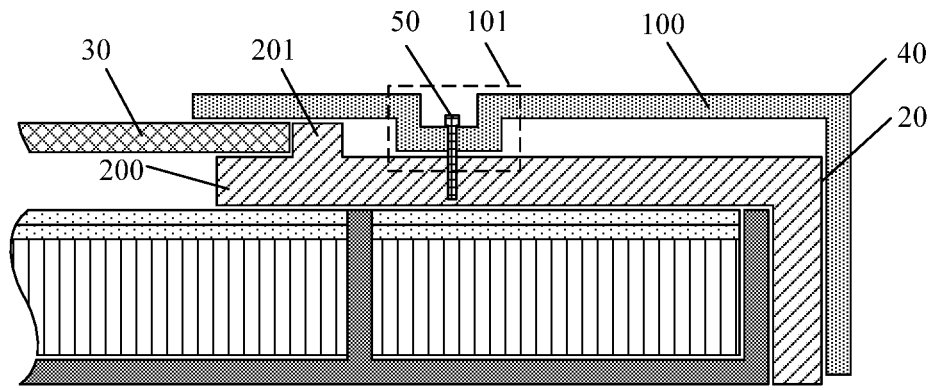
FIG. 4 is a schematic cross-sectional view taken along A-A' direction of another display module provided by an embodiment of the present disclosure.

In an example, in order to further define a location of the display panel 30 held between the first holding part 100 and the second holding part 200 and to ensure that a relative position of the display panel 30 is not significantly shifted, as illustrated in FIG. 4, a side of the second holding part 200 facing to the first holding part 100 is provided with a protrusion 201 which abuts against a side surface of the display panel 30. The protrusion 201 abuts against the side surface of the display panel 30, and hence is capable of limiting the relative position of the display panel 30, so as to play a role of limiting displacement to a certain extent.

Herein, it should be noted that, the above-mentioned protrusion 201 is usually configured as a strip-shaped structure which is adapted to the edge of the display panel 30, and is configured similarly with the above-mentioned bending part 101. For example, when the edge of the display panel 30 is formed as a straight line, the strip-shaped structure is configured as a straight, strip-shaped structure; when the edge of the display panel 30 is formed as a circular arc, the strip-shaped structure is configured as an arc-like, curved, strip-shaped structure, without particularly defined in the embodiments of the present disclosure.

In an example, in order for the above-mentioned protrusion 201 to play a role of limiting displacement and meanwhile protecting the display panel 30 to a certain extent, a height of the protrusion 201 is greater than or equal to a thickness of the display panel 30, so that the protrusion 201 can support the first holding part 100, more or less, and can avoid an excessive deformation of the first holding part 100, thereby preventing the display panel 30 from any damage due to an excessive compression thereon.

Figure 5:
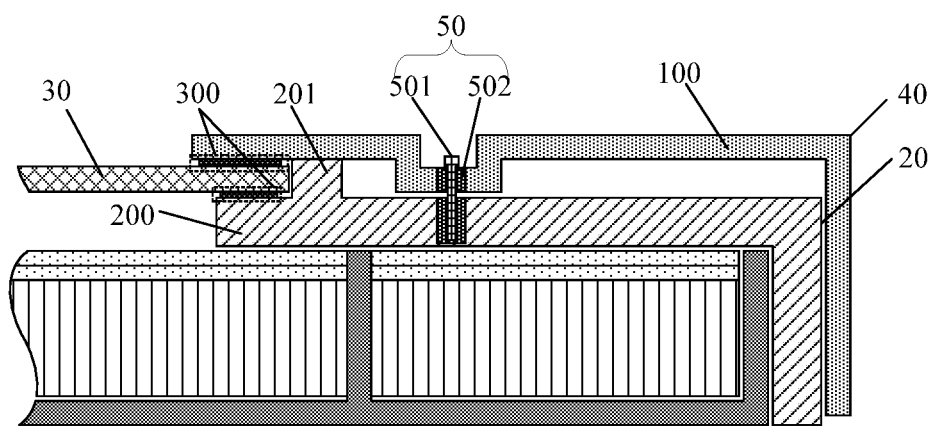
FIG. 5 is a schematic cross-sectional view taken along A-A' direction of yet another display module provided by an embodiment of the present disclosure.

In an example, in order to further avoid a relative movement between the display panel 30 and at least one of the first holding par 100 and the second holding part 200 and to avoid any scratch occurred on the display panel 30, as illustrated in FIG. 5, an elastic structure 300 may be disposed between the first holding part 100 and the display panel 30, and may be disposed between the second holding part 200 and the display panel 30. Under a function of the elastic structure 300, on one aspect, it can prevent at least one of the first holding part 100 and the second holding part 200 from directly contacting with the display panel 30 so as to avoid any scratch of the display panel 30 resulted by the contact; on another aspect, it can prevent the display panel 30 from loosening by means of an elasticity of the elastic structure 300 itself.

FIG. 5 illustrates a case where the elastic structure 300 is disposed between the first holding part 100 and the display panel 30 and is also disposed between the second holding part 200 and the display panel 30, by way of example. Of course, in actual application, the elastic structure 300 may be only disposed between the first holding part 100 and the display panel 30; or the elastic structure 300 may be only disposed between the second holding part 200 and the display panel 30; without particularly defined in the embodiments of the present disclosure.

In an example, the above-mentioned elastic structure 300 may be one or more of an estersil pad, a rubber pad and an elastic foam; and may also adopt other elastic materials; without particularly defined in the embodiments of the present disclosure.

Figure 6:
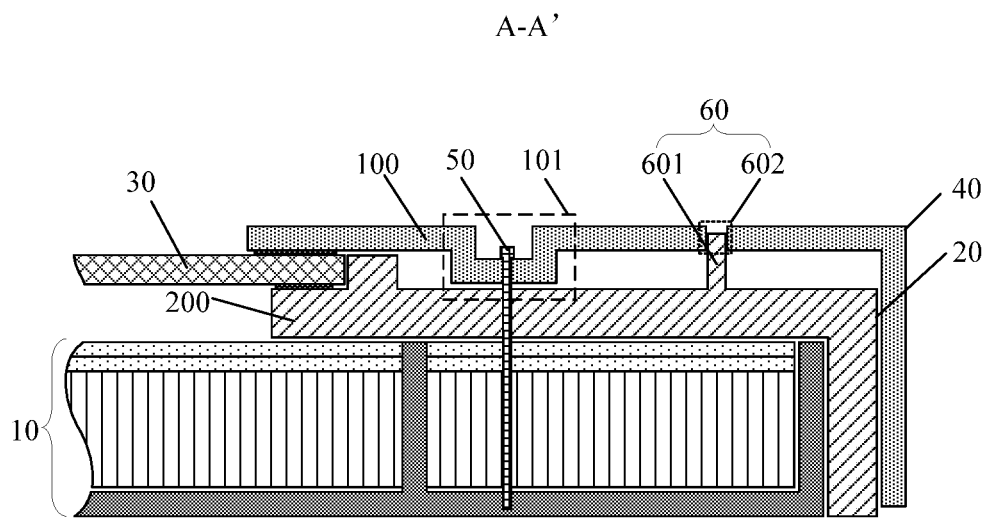
FIG. 6 is a schematic cross-sectional view taken along A-A' direction of still another display module provided by an embodiment of the present disclosure.

In an example, in order to fasten the first holding part 100 and the second holding part 200 without any relative movement there-between when the first holding part 100 and the second holding part 200 initially hold the display panel 30, as illustrated in FIG. 6, locations on the first holding part 100 and the second holding part 200 that are corresponding to each other are provided with a limiting part 60.

Hereinafter, an arrangement manner of the above-mentioned limiting part 60 will be further explained by way of example.

For example, as illustrated in FIG. 6, it's possible that a side of the second holding part 200 facing to the first holding part 100 is provided with at least one limiting pole 601, at a location excluding the one corresponding to the bending part 101, and that the first holding part 100 is provided with a limiting hole 602; by protruding the limiting pole 601 into the limiting hole 602, the first holding part 100 and the second holding part 200 are fastened without relative movement.

Figure 7:
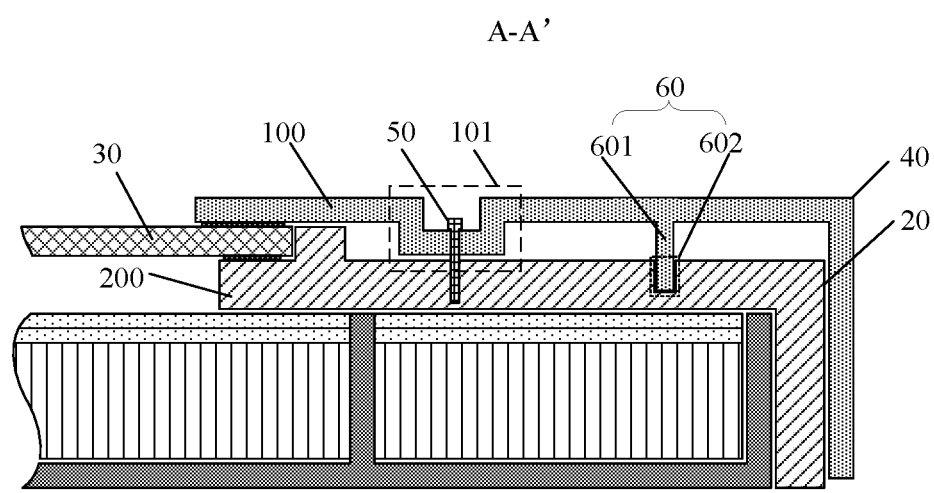
FIG. 7 is a schematic cross-sectional view taken along A-A' direction of further another display module provided by an embodiment of the present disclosure.

For another example, as illustrated in FIG. 7, it's possible that a side of the first holding part 100 facing to the second holding part 200 is provided with at least one limiting pole 601, at a location excluding the one corresponding to the bending part 101, and that the second holding part 200 is provided with a limiting hole 602; by protruding the limiting pole 601 into the limiting hole 602, the first holding part 100 and the second holding part 200 are fastened without relative movement.

Herein, it should be explained that, an amount of the above-mentioned limiting part 60 may be configured as one or plural, without particularly defined in the embodiments of the present disclosure. For example, in case where the display panel 30 has a rectangular shape and each of the first holding part 100 and the second holding part 200 has a shape adapted to the shape of the display panel and is formed as a rectangular frame, by way of example, it's possible to dispose one or two limiting part 60 on one group of opposite sides of the first holding part 100 and the second holding part 200 (that is, on two opposite sides of the first holding part 100 and on two opposite sides of the second holding part); and it's also possible to dispose one limiting part 60 on two groups of opposite sides of the first holding part 100 and the second holding part 200 (that is, on four sides of the first holding part 100 and on four sides of the second holding part 200). In addition, the above-mentioned limiting hole 602 may be a through hole, or may be a blind hole, without particularly defined in the embodiments of the present disclosure.

In an example, as illustrated in FIG. 6, in case where the above-mentioned display module further includes a backlight module 10 disposed at a side of the rear frame 20 facing away from the display panel 30, the backlight module 10 is connected to the second holding part 200 by means of the fastener 50 which penetrates through the first holding part 100 and the second holding part 200. In this way, by means of one and the same fastener 50, it's possible to fasten the display panel 30 between the first holding part 100 and the second holding part 200 while fastening the backlight module 10, so as to avoid separately fastening various parts in the display module by using multiple fasteners 50, thereby simplifying the assembling process of the display module and also improving the fastening effect of the entire display module.

In an example, as illustrated in FIG. 5, the above-mentioned fastener 50 includes a screw 501 and an insert nut 502. The insert nut 502 may be an inserter provided with an internal thread and an external knurl or other patterns, and may be embedded in the first holding part 100 and the second holding part 200, or may be embedded in the first holding part 100, the second holding part 200 and the backlight module 10.

Those skilled in the art should be appreciated that, each of the first holding part 100, the second holding part 200 and the backlight module 10 usually is made from a plastic material, while the insert nut 502 generally is made from a material having high strength such as ceramic and metal. In this way, a fastness between the screw 501 and the insert nut 502 can be significantly increased, so as to considerably improve the fastening effect of the fastener 50. In known technologies, normally, a threaded hole is directly disposed in the first holding part 100 and the second holding part 200, or is directly disposed in the first holding part 100, the second holding part 200 and the backlight module 10; that is, the threaded hole is directly disposed in a plastic material, which is very likely to result in a sharp decrease of the fastness between the screw 501 and such threaded hole due to a damage of a screw thread on an inner side of the threaded hole.

Herein it should be explained that, in case where the fastener 50 includes the screw 501 and the insert nut 502, when the fastener 50 only fastens the display panel 30 through the first holding part 100 and the second holding part, the insert nut 502 embedded in the second holding part 200 may or may not penetrate through the second holding part 200; and when the fastener 50 also fastens the display module 10, apart from the display panel 30, through the first holding part 100 and the second holding part 200, the insert nut 502 embedded in the display module 10 may or may not penetrate through the display module 10. It may be configured according to actual demands, without particularly defined in the embodiments of the present disclosure.

The embodiment of the present disclosure further provides a display device which includes any of the above-mentioned display modules and hence has similar structure with that of the display module provided by the preceding embodiments, achieving similar beneficial effects, without going into details thereof.

It should be explained that, in the embodiments of the present disclosure, the display device at least includes a liquid crystal display panel and an organic light-emitting diode display panel. For example, the display panel may be applied in any products or components with display function such as liquid crystal display device, liquid crystal television, digital photo frame, mobile phone and tablet computer.

The foregoing are merely specific embodiments of the invention, but not limitative to the protection scope of the invention. Within the technical scope disclosed by the present disclosure, any alternations or replacements which can be readily envisaged by one skilled in the art shall be within the protection scope of the present disclosure. Therefore, the protection scope of the invention shall be defined by the accompanying claims.

The present application claims priority of Chinese patent application No. 201621196317.8 filed on Oct. 28, 2016, under the title of "A DISPLAY MODULE AND A DISPLAY DEVICE", the disclosure of which is incorporated herein in its entirety by reference.

What is claimed is:

1. A display module, comprising a rear frame, a display panel and a front frame,
the front frame comprising a first holding part, the rear frame comprising a second holding part, and the first holding part being disposed to be opposite to the second holding part along a thickness direction of the display panel;
an edge of the display panel being held between the first holding part and the second holding part;
the first holding part being provided with a bending part, the bending part being bent towards the second holding part; and
the first holding part and the second holding part being connected through a fastener disposed in the bending part so as to fasten the display panel, wherein
the bending part has a strip-shaped structure which is formed along at least one side of the front frame and has a length greater than ½ of a length of the side where the bending part is formed.

2. The display module according to claim 1, wherein an inner edge of the strip-shaped structure is equidistant or substantially equidistant from the edge of the display panel, at any location along a length direction of the strip-shaped structure.

3. The display module according to claim 1, wherein a side of the second holding part facing to the first holding part is provided with a protrusion which abuts against a side surface of the display panel.

4. The display module according to claim 3, wherein a height of the protrusion is greater or equal to a thickness of the display panel.

5. The display module according to claim 1, wherein a distance from an outer bottom of the bending part to an outer surface of the first holding part, along the thickness direction of the display panel, is greater than a thickness of the display panel.

6. The display module according to claim 1, wherein an elastic structure is disposed between the first holding part and the display panel; and,
an elastic structure is disposed between the second holding part and the display panel.

7. The display module according to claim 6, wherein the elastic structure comprise at least one of estersil pad, rubber pad and elastic foam.

8. The display module according to claim 1, wherein a side of the second holding part facing to the first holding part is provided with at least one limiting pole at a location excluding the one corresponding to the bending part, the first holding part is provided with a limiting hole, and the limiting pole is configured to be protruded into the limiting hole, or
a side of the first holding part facing to the second holding part is provided with at least one limiting pole at a location excluding the one corresponding to the bending part, the second holding part is provided with a limiting hole, and the limiting pole is configured to be protruded into the limiting hole.

9. The display module according to claim 1, further comprising a backlight module disposed at a side of the rear frame facing away from the display panel, and the backlight module is connected to the second holding part by means of the fastener penetrating through the first holding part and the second holding part.

10. The display module according to claim 1, wherein the fastener comprises a screw and an insert nut.

11. A display device, comprising a display module, the display module comprising a rear frame, a display panel and a front frame,
the front frame comprising a first holding part, the rear frame comprising a second holding part, and the first holding part being disposed to be opposite to the second holding part along a thickness direction of the display panel;
an edge of the display panel being held between the first holding part and the second holding part;
the first holding part being provided with a bending part, the bending part being bent towards the second holding part; and
the first holding part and the second holding part being connected through a fastener disposed in the bending part so as to fasten the display panel, wherein
the bending part has a strip-shaped structure which is formed along at least one side of the front frame and has a length greater than ½ of a length of the side where the bending part is formed.

12. The display device according to claim 11, wherein an inner edge of the strip-shaped structure is equidistant or substantially equidistant from the edge of the display panel, at any location along a length direction of the strip-shaped structure.

13. The display device according to claim 11, wherein a side of the second holding part facing to the first holding part is provided with a protrusion which abuts against a side surface of the display panel.

14. The display device according to claim 13, wherein a height of the protrusion is greater than or equal to a thickness of the display panel.

15. The display device according to claim 11, wherein a distance from an outer bottom of the bending part to an outer surface of the first holding part, along the thickness direction of the display panel, is greater than a thickness of the display panel.

16. The display device according to claim 11, wherein an elastic structure is disposed between the first holding part and the display panel; and,
an elastic structure is disposed between the second holding part and the display panel.

17. The display device according to claim 11, wherein an elastic structure is disposed between the first holding part and the display panel; or,
an elastic structure is disposed between the second holding part and the display panel.

18. The display module according to claim 1, wherein an elastic structure is disposed between the first holding part and the display panel; or,
an elastic structure is disposed between the second holding part and the display panel.

19. The display module according to claim 18, wherein the elastic structure comprises at least one of estersil pad, rubber pad and elastic foam.

20. The display module according to claim 1, wherein two bending parts are provided on opposite sides of the front frame, respectively, and
each of the two bending parts is provided with two fasteners.

* * * * *